United States Patent [19]
Jantzi et al.

[11] Patent Number: 5,438,618
[45] Date of Patent: Aug. 1, 1995

[54] VOCAL FREQUENCY SUPPRESSION APPARATUS AND METHOD

[75] Inventors: C. Earl Jantzi, Zion, Ill.; Richard C. Gall, Middleton, Wis.

[73] Assignee: Mytech Systems Corporation, Zion, Ill.

[21] Appl. No.: 152,854

[22] Filed: Nov. 15, 1993

[51] Int. Cl.6 ............................................. H04M 1/50
[52] U.S. Cl. .................................. 379/387; 379/389; 379/360; 379/352; 379/351; 379/441
[58] Field of Search ............... 379/387, 389, 360, 352, 379/351, 441

[56] References Cited

U.S. PATENT DOCUMENTS

| | | | |
|---|---|---|---|
| 2,620,398 | 12/1952 | De Vries | 379/331 |
| 3,715,518 | 2/1973 | Campbell et al. | 379/105 |
| 3,944,753 | 3/1976 | Proctor et al. | 379/351 |
| 4,042,790 | 8/1977 | Richards | 379/351 |
| 4,747,126 | 5/1988 | Hood et al. | 379/351 |
| 4,885,763 | 12/1989 | O'Brien et al. | 379/351 |
| 5,119,412 | 6/1992 | Attahah | 379/104 |
| 5,172,406 | 12/1992 | Locke | 379/386 |

*Primary Examiner*—James L. Dwyer
*Assistant Examiner*—Jacques M. Saint-Surin
*Attorney, Agent, or Firm*—Dick and Harris

[57] ABSTRACT

A vocal frequency suppression apparatus for suppressing selected portions of a vocal signal to prevent inadvertent control of components controlled by dual tone multi-frequency ("DTMF") codes. The vocal frequency suppression apparatus includes a DTMF code generator having a plurality of user-selectable switches. The apparatus further produces a vocal signal which may contain vocal frequencies which correspond to at least one frequency of at least one of the DTMF codes. The apparatus includes a device for suppressing one or more of the vocal frequencies which correspond to frequencies found in the DTMF codes to prevent inadvertent control of any DTMF controlled components by the vocal signal. The suppression device is operably located between the producing device and the DTMF generator.

10 Claims, 1 Drawing Sheet

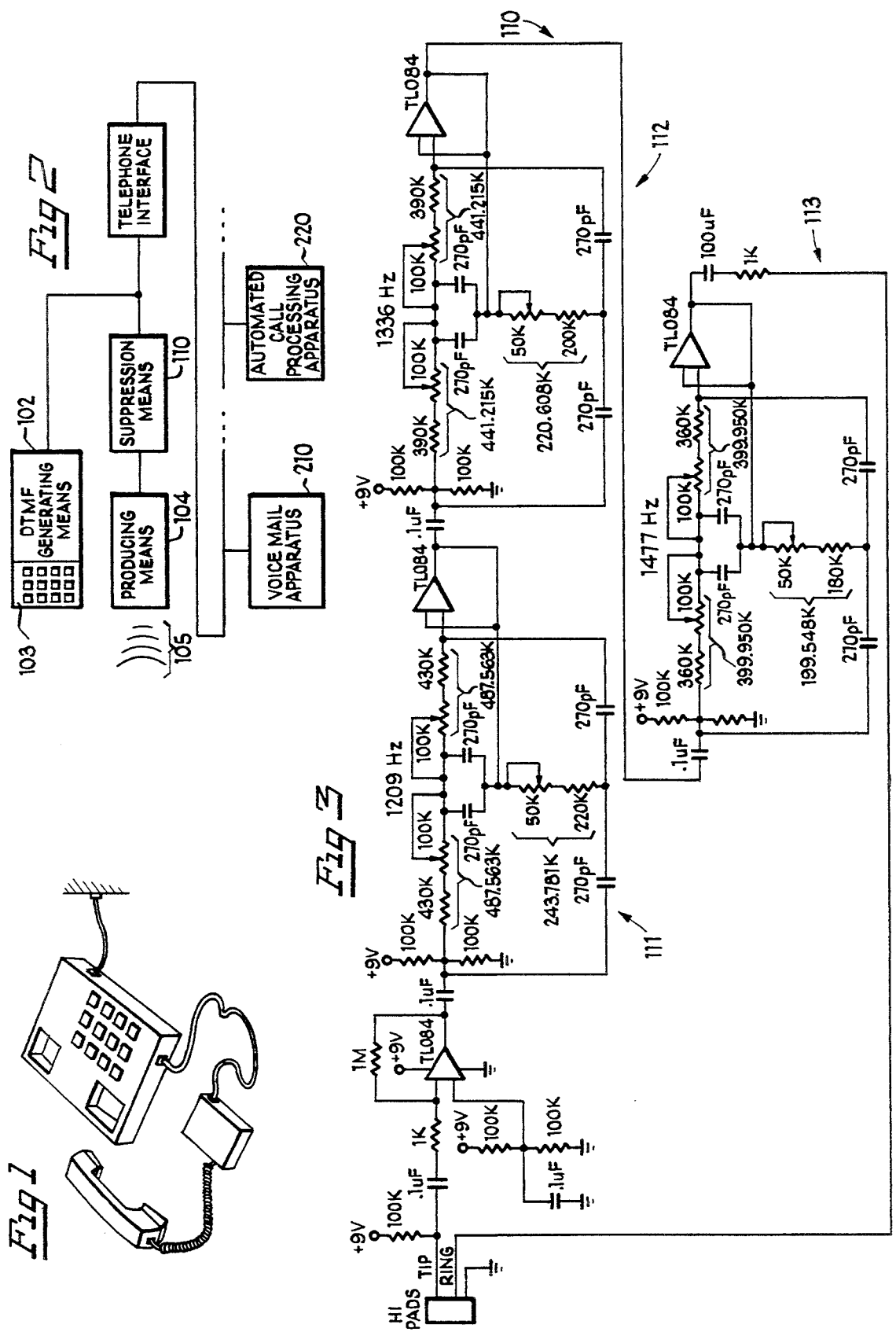

VOCAL FREQUENCY SUPPRESSION APPARATUS AND METHOD

BACKGROUND OF THE INVENTION

1. Field of the Invention

The present invention relates in general to a signal suppression apparatus and, in particular, to a vocal frequency suppression apparatus for suppressing any vocal frequencies which correspond to frequencies found within DTMF codes, so as to prevent the inadvertent activation of DTMF controlled components, such as voice mail systems.

2. Background Art

The problem of inadvertent activation of dual tone multi-frequency controlled components, such as voice mail systems, is well known in the art. Dual tone multi-frequency ("DTMF") codes are each comprised of low frequency components (697Hz, 770Hz, 852Hz and 941Hz) and high frequency component (1209Hz, 1336Hz, 1477Hz and 1633Hz) of equal magnitude. This scheme itself was developed to prevent inadvertent control of DTMF controlled devices. However, it has been found that some individuals inadvertently produce frequencies within their voices which correspond to various ones of the high and/or low frequencies of the DTMF codes–thereby inadvertently actuating some DTMF controlled components, such as voice mail systems.

Various approaches have been devised to prevent such occurrences. For instance, U.S. Pat. No. 2,620,398 to De Vries discloses direction-sensitive signal suppressors located at the "ends" of a transmission line and before any user's individual telephone line. These suppressors influence the value of vocal frequencies which correspond to DTMF codes so as to reduce the likelihood of inadvertently triggering signal receivers. De Vries utilizes an active filtering approach which locates "true" signals by comparing the magnitude of the high and low frequencies and attenuating "false" signals such that only the true signals proceed onto the transmission line.

U.S. Pat. No. 3,715,518 to Campbell et al. discloses a system for preventing inadvertent activation of a voice mail system by recorded DTMF tones. Campbell momentarily interrupts the outgoing recorded transmission when DTMF signals are detected to allow the detector to accept valid DTMF codes. If the tone stops (presumably due to the interruption of the recording) then the signal is assumed to be invalid.

U.S. Pat. No. 3,944,753 to Proctor et al. teaches an apparatus which detects voice and other noise signals which may be present on a telephone line utilizing three different detection systems concurrently. The first detection system is comprised of two frequency drop detectors. DTMF signals maintain a substantially constant frequency after their initial frequency rise and further maintain a relatively constant amplitude. Therefore, one can use a frequency drop detector to record rapid voltage drops of approximately 0.6V, a condition which is apparently impossible for a "true" DTMF signal. The second detection system compares signals to a DC threshold representing some frequency higher than 1633Hz, the highest standard DTMF frequency. The third detection system detects noise signals, such as those caused by a high amplitude whistle, which would pass through both band pass filters in Proctor at the same frequency. A frequency coincidence detector analyzes the frequencies in both the upper and lower band for identical frequencies, the location of which would indicate a noise signal. These three detectors can each independently suppress the input signal, such that it is not received by the DTMF tone receiver.

U.S. Pat. No. 4,042,790 to Richards cross compares the average voltage peak amplitudes of the signals in the upper and lower frequency bands of DTMF codes and where the average voltage peak amplitudes in one band exceeds the other by a ratio greater than approximately 3:1, the tone receiver output is inhibited. Richards also detects the average voltage peak amplitude in the frequency spectrum above 1700Hz, which is above DTMF signal range and compares this amplitude with the amplitudes of the upper and lower bands to determine, if the signal component above 1700Hz is greater than 0.25 of the upper or lower band amplitudes, the tone receiver output is again inhibited.

U.S. Pat. No. 4,747,126 to Hood et al. discloses an overall voice mail system in which DTMF command signals may be recorded and then at playback may inadvertently activate a command. After discounting the possibility of filtering tones from the tape record head input, because of the number and wide frequency range of the component tones, Hood provided a system which would record tones of a shorter duration than the duration required to activate the circuit during playback.

U.S. Pat. No. 4,885,763 to O'Brien et al. discloses a voice mail system which includes a method and apparatus for muting a previously recorded audio signal upon detection of a DTMF signal to differentiate between recorded versus potentially valid DTMF codes. U.S. Pat. No. 2,572,074 to Terry et al. discloses a guard circuit which blocks the operation of a tone receiver if frequencies other than the signaling (DTMF) frequency are present on the line. This is accomplished by using compensating circuits to offset the rise in voltage when more than one signaling frequency is received.

One shortcoming of some of the forementioned devices is that they are wholly integrated into their respective systems. Thus, requiring the owner of a system subject to inadvertent control problems to purchase an entire system to circumvent that problem.

Another shortcoming of some of the prior art devices, is the complicated and expensive approaches used to prevent activation.

A further shortcoming of some of the prior art, is their failure to provide protection against vocal frequencies which may "talk-off" a device.

It is thus an object of the present invention to provide a device for suppressing one or more vocal frequencies which correspond to DTMF frequencies from a vocal signal before that vocal signal is combined with generated DTMF codes so as to prevent inadvertent activation of DTMF controlled devices, such as voice mail systems.

It is an associated object of the present invention to provide an inexpensive, portable device which can be easily moved between systems to prevent inadvertent control of DTMF controlled devices.

It is an additional associated object to provide a simple, and thus relatively inexpensive device for suppressing the vocal frequencies corresponding to DTMF frequencies by requiring suppression of vocal frequencies corresponding to DTMF frequencies to occur prior to the introduction of generated DTMF codes.

These and other objects of the present invention will become apparent in light of the present specification, claims and drawings.

SUMMARY OF THE INVENTION

The present invention comprises a vocal frequency suppression apparatus for suppressing selected portions of a vocal signal within a telephone system. The telephone system may include at least one component controlled by dual tone multi-frequency ("DTMF") codes, such as a voice mail system, which could potentially be inadvertently controlled by the vocal signal.

The vocal frequency suppression apparatus includes a DTMF code generator, which includes a plurality of user-selectable switches. Each of the user-selectable switches corresponds to a predetermined one of the DTMF codes, which comprise a unique pair of frequencies in a preferred embodiment. The plurality of user-selectable switches is arranged in a 3×4 matrix and each of the switches has indicia thereon indicating the switch designation.

The apparatus further comprises means for producing the vocal signal, which may comprise a microphone. The produced vocal signal may contain vocal frequencies which correspond to at least one frequency of at least one of the DTMF codes.

The apparatus also includes means for suppressing one or more of the vocal frequencies which correspond to at least one frequency of at least one of the DTMF codes. This suppression means is operably located between the producing means and the generating means, so as to suppress one or more of the vocal frequencies which correspond to at least one frequency of at least one of the DTMF codes from the vocal signal prior to the vocal signal passing to the generating means.

In the preferred embodiment, the producing means is operably associated with a telephone handset and the generating means with a base unit associated with the handset. In this embodiment, the suppression means is operably located between the handset and the base unit and may comprise a modular unit so as to facilitate connection, disconnection and easy relocation between the handset and the base unit, such that a user could "install" the suppression means into any system in which inadvertent activation occurs.

In one embodiment, the suppression means comprises at least one stop-band filter wherein each of at least one stop-band filter is tuned to filter out one frequency of the two frequencies of at least one of the DTMF codes, so as to prevent inadvertent control of a DTMF controlled component, while minimizing the distortion of said vocal signal.

The invention further comprises a method for preventing the inadvertent control of at least one DTMF code controlled component found within a telephone system by a vocal signal wherein the vocal signal may contain one or more frequencies corresponding to one or more of the DTMF codes. This method includes the steps of: a) generating the vocal signal, which may contain one or more frequencies corresponding to one or more of the DTMF codes; b) transmitting the vocal signal to a receiving station; c) suppressing at least one frequency corresponding to at least one of the DTMF codes from the vocal signal resulting in a modified vocal signal; d) introducing the DTMF codes from a DTMF generator into the modified vocal signal to, in turn, create a combined signal; and e) transmitting the combined signal to the DTMF controlled components of the telephone system.

BRIEF DESCRIPTION OF THE DRAWINGS

FIG. 1 of the drawings is a perspective view of one embodiment of Applicant's vocal frequency suppression apparatus attached within its intended environment;

FIG. 2 of the drawings is a block diagram of the vocal frequency suppression apparatus; and FIG. 3 of the drawings is a schematic diagram of one potential embodiment of the suppression means of the vocal suppression apparatus.

DETAILED DESCRIPTION OF THE DRAWINGS

While this invention is susceptible of embodiment in many different forms, one specific embodiment is shown in the drawings and will herein be described in detail, with the understanding that the present disclosure is to be considered as an exemplification of the principles of the present invention and is not intended to limit the invention to the embodiment illustrated.

FIG. 1 of the drawings is a perspective view of vocal frequency suppression apparatus 100 for suppressing selected portions of vocal signal on line 101 (shown in FIG. 2). Apparatus 100 may be disposed within telephone system 200 which, as shown in FIG. 2, includes at least one component controlled by dual tone multi-frequency ("DTMF") codes, such as voice mail apparatus 210, automated call processing apparatus 220 and other like devices. Most components in telephone system 200 are interconnected through tip and ring lines, however, it is contemplated that apparatus 100 can be used in combination with a cellular telephone, which is connected to the remainder of a telephone system through a radio frequency link.

FIG. 2 of the drawings is a block diagram showing the various components of vocal frequency suppression apparatus 100 and their relation to telephone system 200. Vocal frequency suppression apparatus 100 includes DTMF generating means 102, which generates DTMF codes, as is well-known in the art. DTMF generating means 102 includes a plurality of user-selectable switches 103, which, in a preferred embodiment, comprises a 3×4 matrix of push-button switches. Each switch corresponds to a unique pair of frequencies which comprise a DTMF code.

Vocal frequency suppression apparatus 100 further includes producing means 104 which produces a vocal signal on line 101. In a preferred embodiment, producing means 104 comprises a microphone which accepts a voice 105 and then converts it to a vocal signal. Due to variations in voice 105, vocal signal 101 may contain vocal frequencies which correspond to at least one frequency of at least one of the DTMF codes. Where vocal signal 101 contains both frequencies corresponding to a particular DTMF code inadvertent control of voice mail apparatus 210, automated call processing apparatus 220, or like devices may occur.

Vocal suppression apparatus 100 additionally includes suppression means 110 to preclude such inadvertent control of such DTMF controlled devices through the suppression of one or more of the vocal frequencies which correspond to at least one frequency of the at least one of the DTMF codes. Suppression means 110 is operably located between producing means 104 and DTMF generating means 102. This configuration allows suppression means 110 to suppress one or more of the vocal frequencies which correspond to the frequencies of the DTMF codes from the vocal signal prior to its combination with DTMF codes generated by DTMF generating means 102. Thus, because the "true" DTMF codes are introduced "down line" from suppression means 110 the design of suppression means 110 is not only simple and relatively inexpensive but it also virtually eliminates the possibility of the additional DTMF controlled devices being inadvertently activated by the vocal signal.

In a preferred embodiment, suppression means 110 suppresses one frequency from each of the twelve DTMF codes contained in a standard telephone keypad, like the plurality of user-selectable switches 103. By suppressing only one frequency from each unique pair of frequencies, degradation of the voice signal can be minimized. Furthermore, by selecting those suppressed frequencies from the high frequency DTMF range, degradation is also minimized inasmuch as voice 105 is less likely to comprise stronger high frequency components than the contemporaneous low frequency components.

In one preferred embodiment, suppression means 110 may be operably connected to a standard telephone. In this embodiment, producing means 104 is operably associated with handset 106 and comprises a microphone disposed within the mouthpiece of handset 106. Also in this embodiment, generating means 102 is operably associated with base unit 107. Base unit 107 further has a plurality of user-selectable switches 103 disposed upon its face, such that a user can place a telephone call or intentionally command voice mail apparatus 210. In this embodiment, suppression means 110 is operably located between handset 106 and base unit 107. As in the other embodiments of Applicant's invention this configuration precludes suppression of the DTMF codes generated by generating means 102 while suppressing the vocal frequencies corresponding to the DTMF codes which may be present in the vocal signal. This preferred embodiment highlights the modularity of vocal suppression apparatus 100. At a minimum, suppression means 110 is modular so as to facilitate connection, disconnection and easy relocation between handset 106 and base unit 107. Such modularity provides individuals with voices that "talk-off" DTMF controlled devices, such as voice mail apparatus 210 and/or automated call processing apparatus 220, a portable device which can be appended onto almost any existing system - without requiring any modification to that existing system.

FIG. 3 of the drawings is a schematic diagram of one potential embodiment of suppression means 110. As stated above, due to the configuration of DTMF generating means 102, producing means 104 and suppression means 110, the design of suppression means 110 can be substantially simplified. In this potential embodiment, suppression means 110 comprises three stop band filter networks 111 through 113. In the depicted embodiment, stop band filter networks 111 through 113 are tuned to filter out one frequency of each of the DTMF codes formed in a standard telephone.

DTMF codes are assigned in telephone base units such that each column is represented by a frequency and each row is likewise represented. In the preferred embodiment, by stopping the three column frequencies all DTMF codes are protected. This approach is preferred to stopping the row frequencies because there are four row frequencies which would thus require an additional stop-band filter network. Furthermore, the row frequencies are assigned to the low frequency range of the DTMF codes –voice 105 is less likely to have substantial high frequency components than low frequency components. Thus, stopping the high frequencies minimizes circuitry and also minimizes distortion of the vocal signal.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A vocal frequency suppression apparatus for suppressing selected portions of a vocal signal within a telephone system, said telephone system including at least one component controlled by dual tone multi-frequency ("DTMF") codes, said vocal frequency suppression apparatus comprising:
   - means for generating said DTMF codes, said generating means including a plurality of user-selectable switches, wherein each of said user-selectable switches corresponds to a predetermined one of said DTMF codes, each of said DTMF codes comprising a unique pair of frequencies;
   - means for producing said vocal signal, wherein said vocal signal may contain vocal frequencies which correspond to at least one frequency of at least one of said DTMF codes;
   - means for suppressing a preselected one or more of said vocal frequencies which correspond to said at least one frequency of said at least one of said DTMF codes, so as to prevent inadvertent control of said at least one component controlled by said DTMF codes by said vocal signal,
   - said suppression means being operably located between said producing means and said generating means, so as to suppress one or more of said vocal frequencies which correspond to said at least one frequency of said at least one of said DTMF codes from said vocal signal prior to said vocal signal passing to said generating means.

2. The invention according to claim 1 wherein said telephone system includes a handset and a base unit operably connected to said handset:
   - said producing means being operably associated with said handset, said generating means being operably associated with said base unit, and said suppressing means being operably located between said handset and said base unit, so as to preclude inadvertent suppression of said DTMF codes generated by said generating means while suppressing one or more of said vocal frequencies which correspond to said at least one frequency of said at least one of said DTMF codes.

3. The invention according to claim 2 wherein said telephone system further includes voice mail means operably associated with said base unit for receiving and playing back voice messages;
   - said voice mail means being at least partially controlled by at least one of said DTMF codes; and
   - said suppression means being operably located between said handset at producing means and said base unit generating means, so as to prevent inadvertent control of said voice mail means by said vocal signal, while still providing for such control of said voice mail means by said DTMF codes generated by said DTMF generator.

4. The invention according to claim 2 wherein said suppression means comprises a modular unit so as to facilitate connection, disconnection and easy relocation between said handset and said base unit and other ones of said handset and said base unit.

5. The invention according to claim 1 wherein said telephone system further includes voice mail means operably associated with said base unit for receiving and playing back voice messages;
- said voice mail means being at least partially controlled by at least one of said DTMF codes;
- said suppression means being operably located between said producing means and said generating means, so as to prevent inadvertent control of said voice mail means by said vocal signal, while still providing for such control of said voice mail means by said DTMF codes generated by said DTMF generator.

6. The invention according to claim 1 wherein said suppression means comprises at least one stop-band filter, each of said at least one stop-band filter being tuned to filter out one frequency of one or more of said at least one of said DTMF codes, so as to prevent inadvertent control of said at least one component controlled by DTMF codes, while minimizing the distortion of said vocal signal.

7. A telephone system of the type controlled by dual tone multi-frequency ("DTMF") codes, the system comprising:
- a handset including a transducer and a speaker, said transducer producing a vocal signal, wherein said vocal signal may contain vocal frequencies which correspond to at least one frequency of at least one of said DTMF codes;
- a base unit operably associated with said handset, said base unit having associated therewith a DTMF code generator, said base unit being operably connected to a subscriber line;
- voice mail means operably connected to said base unit for receiving and playing back voice messages, said voice mail means being at least partially controlled by at least one of said DTMF codes; and
- means for suppressing one or more of said vocal frequencies which correspond to said at least one frequency of said at least one of said DTMF codes, so as to prevent inadvertent control of said at least one component controlled by said DTMF codes by said vocal signal,
- said suppression means being operably located between said handset and said base unit, so as to prevent inadvertent control of said voice mail means by said vocal signal, while still providing for such control of said voice mail means by said DTMF codes generated by said DTMF generator.

8. The invention according to claim 7 wherein said suppression means comprises a modular unit so as to facilitate connection, disconnection and easy relocation between said handset and said base unit and other ones of said handset and said base unit.

9. The invention according to claim 7 wherein said suppression means comprises at least one stop-band filter, each of said at least one stop-band filter being tuned to filter out one frequency of one or more of said at least one of said DTMF codes, so as to prevent inadvertent control of said voice mail apparatus, while minimizing the distortion of said vocal signal.

10. A method for preventing the inadvertent control of at least one DTMF code controlled component found within a telephone system, having a base unit with a DTMF generator, by a vocal signal wherein the vocal signal may contain one or more frequencies corresponding to one or more of the DTMF codes, the method comprising the steps of:
- generating the vocal signal, which may contain the one or more frequencies corresponding to one or more of the DTMF codes;
- transmitting the vocal signal to the base unit;
- suppressing at least one of a pre-selected at least one frequency corresponding to at least one of the DTMF codes from the vocal signal resulting in a modified vocal signal, prior to the vocal signal reaching the DTMF generator.

* * * * *